Fig. 1
Fig. 2
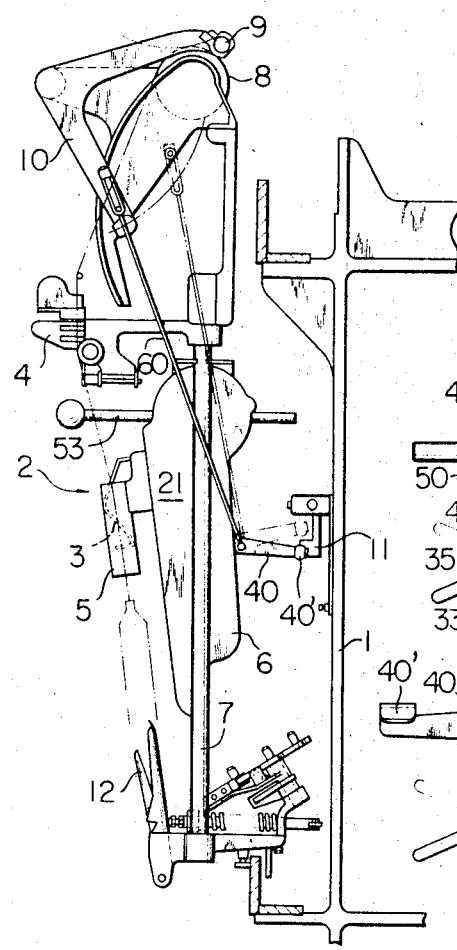
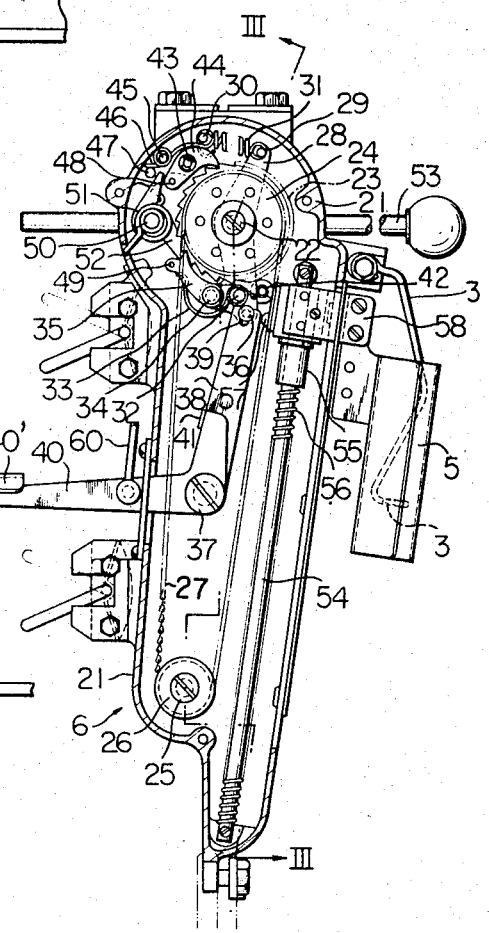

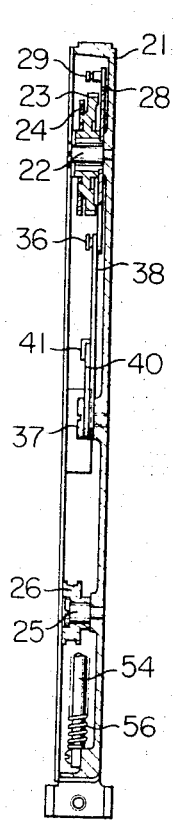

United States Patent Office 3,450,358
Patented June 17, 1969

3,450,358
AUTOMATIC WINDER
Isamu Matsui, Kyoto-shi, Japan, assignor to Toyo Boseki Kabushiki Kaisha, Osaka, and Murata Machinery, Ltd., Kyoto-shi, Kyoto, Japan, both companies of Japan
Filed Dec. 14, 1966, Ser. No. 601,717
Claims priority, application Japan, Dec. 17, 1965, 40/77,871; Dec. 31, 1965, 40/81,730
Int. Cl. B65h 54/22, 63/00
U.S. Cl. 242—35.5      16 Claims

ABSTRACT OF THE DISCLOSURE

In an automatic winding machine having a plurality of winding units travelling along a looped passage surrounding a main frame of the winding machine, each winding unit has an anti-sloughing tube disposed above the supply cop at a position along a yarn path between the supply cop and a winding mechanism. The anti-sloughing device is shifted toward the supply cop as the winding operation progresses for each supply cop, and is returned to its uppermost position when a fresh supply cop is supplied to the winding unit.

The present invention relates to an improved automatic winder having a plurality of winding units travelling along a looped passage, and particularly relates to an improved automatic winder having a plurality of winding units provided with an anti-sloughing device for controlling ballooning which is formed between the tension device and a supply cop, and further provided with a controlling device for controlling yarn length of a full package respectively.

Recently, to improve the production efficiency of an automatic winder, various attempts for increasing the production efficiency, such as an increase of the winding speed, have been made. However, the increase of the winding speed cannot be obtained without controlling winding tension, to prevent yarn breakage caused by a distinctive ballooning that developed between a supply cop and a tension device of the respective winding units. Moreover, the unbalanced condition of the above-mentioned ballooning causes an irregular winding condition so that it is difficult to produce a full packaged cheese or cone having a uniform diameter under this irregular winding condition.

In the conventional automatic winder having a plurality of winding units and a looped passage the control system for controlling the weight and length of the full package has been generally operated by measuring the size of a full package. However, it has been difficult to produce full packages having a uniform length of yarn due to the differences in the yarn counts, the winding tensions, etc.

An object of the invention is to provide an improved travelling type automatic winder which is capable of producing cheeses or cones with a high production efficiency.

An other object of the invention is to provide an improved travelling type automatic winder which is capable of producing with high efficiency full packaged cheeses or cones having uniform shape and length of yarn.

A further object of the invention is to produce a full packaged cheese or cone by the automatic winder of the invention so as to increase the operative efficiency of the preparatory process before the weaving or knitting operation, by producing a full packaged cheese or cone having uniform length of yarn.

A better understanding, further features and other objects and advantages of this invention will become obvious to those skilled in the art from the appended drawings.

FIG. 1 is a side view of a winding unit of the traveling type automatic winder having an anti-sloughing tube and a controlling device for controlling the yarn length of a full packaged cheese or cone, according to the invention.

FIG. 2 is a side view showing the detailed mechanism of the anti-sloughing device shown in FIG. 1.

FIG. 3 is a front view of the anti-sloughing device, partly in section, taken along IV–III in FIG. 2.

FIG. 4 is a side view of a cam mechanism for shifting an anti-sloughing tube of the anti-sloughing device shown in FIG. 2.

FIG. 5 is a side view of an other embodiment of anti-sloughing device according to the invention.

*Anti-sloughing device for controlling ballooning*

Figure 6:
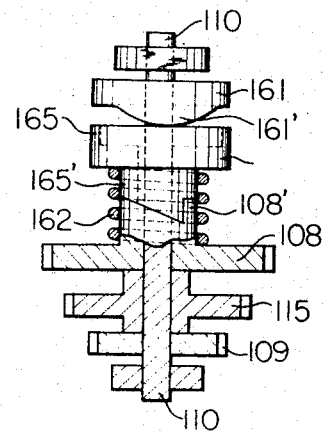
FIG. 6 is an elevation view, partly in section, of a shifting mechanism for continuous shifting the anti-sloughing tube, according to the invention.

Generally, when winding yarn onto a package of cheese or cone from a supply cop supported by a peg of the winging unit of the winding machine, the ballooning developed between the suply cop and a tension control device varies the winding tension which variation is impossible to eliminate completely by the above-mentioned tension device. Therefore, it is preferable to control or eliminate the above-mentioned ballooning so as to maintain a uniform winding tension. To obtain the above-mentioned control, an anti-sloughing device is disposed at the position where there is possibility of ballooning. The position of the ballooning moves according to the condition of the package of the supply cop supported by the peg, consequently, the anti-sloughing device according to the invention is moved according to the condition of the package of the supply cop so as to control ballooning of the winding yarn. An embodiment of the anti-sloughing device of the invention is shown in FIGS. 1, 2, 3 and 4. The anti-sloughing device of the invention comprises an anti-sloughing tube and a shifting mechanism for shifting the anti-sloughing device downward according to the condition of the yarn package of the supply cop supported by a peg of the winding unit. The anti-sloughing tube is disposed to the respective winding units in such a way that the yarn passage between the supply cop and the tension control device passes through the longitudinal axis of the anti-sloughing tube, and the anti-sloughing tube is shifted downward along the above-mentioned yarn passage by the consumption of the yarn of the supply cop.

The shifting device of the anti-sloughing device comprises a chain driving mechanism and a plurality of cam mechanisms disposed to the machine frame of the winding machine. Levers related with the cam mechanism actuate the turning motion of a chain wheel of the chain driving mechanism so as to drive a chain. The anti-sloughing tube is secured to the chain in such a way that the yarn passage between the supply cop and the tension control device passes along the longitudinal axis of the anti-sloughing tube. The levers actuate the drive of the chain wheel so as to shift the anti-sloughing tube downward in a condition corresponding to the exhausted condition of the yarn of the supply cop. And, when the supply of yarn in the supply cop is exhausted or the yarn supplying from the supply cop breaks down or the packaged condition of the cheese or the cone becomes full, that is, the package of the cheese or the cone is shifted upward from the winding drum of the respective winding unit, the above-mentioned cam mechanism does not actuate the drive of the chain, consequently, the anti-sloughing tube does not move downward. Referring to FIGS. 1, 2, 3 and 4, an anti-sloughing device 6 having an anti-sloughing tube 5 is disposed to a respective winding unit 2 in such a way that the anti-sloughing tube 5 is disposed to the yarn passage between a peg of the respective winding unit 2 and a tension device 4. In a conventional winding machine, a winding drum 8 is disposed on the upper portion of a machine frame 1 of the respective winding unit 2, and a pair of cradle arms 10 for supporting a paper tube for winding yarn on it by a paper tube-supporting shaft 9. A plurality of cams 11 for actuating a lever which actuates the anti-sloughing device of the invention are disposed on the machine frame 1 with an intervened space corresponding approximately to four winding units. The anti-sloughing device 6 is contained in respective cases 21. A chain wheel 24 to which is coaxially attached a ratchet wheel 23 is mounted on a shaft 22 of the respective case 21. A chain wheel 26 mounted on a shaft 25 is driven by the chain wheel 24 by way of a chain 27. A plate-shaped lever 28 is mounted on the shaft 22. A pin 29 is secured to the top end portion of the lever 28, a spring 31 connected to the pin 29 with the other pin 30 secured to the case 21 provides a force for turning the lever 28 in a counterclockwise direction around the shaft 22. A spring 33 supported by a pin 32 is disposed to the bottom end of the lever 28, a pawl 35 mounted on a shaft 34 presses against the ratchet wheel 23 so as to always engage with a tooth of the ratchet wheel. A lever 38 is rotatably mounted on a shaft 37, and a forked portion 39 formed at the top end portion of the lever 38 engages with a pin 36 disposed to a lower end portion of the lever 28, and the middle portion of the lever 38 engages with a pawl 41 of a lever 40 coaxially mounted on the shaft 37, and the other end portion 40' of the lever 40 contacts with the cam 11. A stopper 42 for stopping the turning of the lever 28 is secured to the case 21. A pawl 44 is rotatably mounted on a shaft 43. The pawl 44 engages with a tooth of the ratchet wheel 23 so as to stop the turning of the ratchet wheel 23 in a counterclockwise direction. A spring 46 is supported by a pin 45 disposed to the cases 21 in such a way that an end of the spring 46 contacts with a stopper 47 and the other end of the spring 46 press the pawl 44 so as to always engage with the ratchet wheel 23. Moreover, a lever 52 mounted on a shaft 50 is disposed on an intermediate position between a pin 48 disposed to the pawl 44 and a pin 49 disposed to the pawl 35, and the lever 52 is always provided with a turning force in a counterclockwise direction by a spring 51. When the lever 52 is turned in a clockwise direction, the lever 52 engages with the pin 48 of the pawl 44 and the pin 49 of the pawl 35, thereby the respective engagements of the pawl 44 and the pawl 35 with the ratchet wheel 23 are released. The shaft 50 is constructed as a unit with a handle 53, consequently, by the turning motion of the handle 53 around the shaft 50, the above-mentioned engagements of the pawls 44 and 35 with the ratchet wheel 23 can be released. A shaft 54 is disposed in the case 21 in a parallel condition with the chain 27, a spring 56 is disposed on the bottom portion of the shaft 54 so a slider 55 slidably mounted on the shaft 54 spring up, as shown in FIG. 2. The slider 55 is secured to the chain 27 by a fastener 57 and supports the anti-sloughing tube 5 through a supporting plate 58 secured to its outside portion. A yarn guide 3 is secured to the case 21 and can enter into the anti-sloughing tube 5 when the tube 5 is shifted to the upper portion of the shifting passage.

Figure 7:
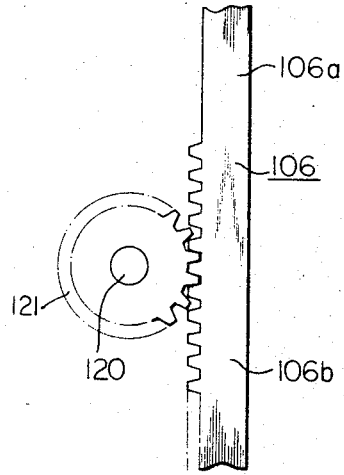
FIGS. 7 and 8 are detailed side views of actuating mechanisms for shifting the anti-sloughing device of the present invention.

In FIGS. 5, 6, 7 and 8, the other embodiment of the shifting mechanism for continuously shifting the anti-sloughing tube of the invention is shown. In the drawings, an anti-sloughing device having an anti-sloughing tube 105 is disposed to the respective winding unit in the same way as that of the first embodiment shown in FIG. 2. The winding drum 8 and a pair of cradle arms 10 supporting shaft 9 are also disposed to the winding unit in the same way as in FIG. 2. A rack 106 is disposed on the machine frame in the form of a closed loop at the corresponding position of the looped passage of the respective winding units. An anti-sloughing device 104 is contained in the respective case 107 disposed on the respective winding units. Rotatable shafts 112, 110 and 116 are disposed on the anti-sloughing device 104, as shown in FIG. 5. The shaft 116 is driven by way of a gear train 119 having a pinion shaft 120 by the engaging of a pinion 121 with the rack 106 while the winding unit is travelling along the looped passage, that is, along the rack 106. Sprocket wheels 114, 115 are secured on the respective shaft 116, 110 and a chain 117 transmits the rotation of the shaft 116 to the shaft 110 by way of the chain drive of the sprocket wheel 114 with the sprocket wheel 115. Another sprocket wheel 108 is slidably mounted on the shaft 110. Referring to FIG. 6, the sprocket wheel 108 is provided with a clutch portion 108' so as to engage with a clutch portion 165' of a clutch 165 slidably mounted on the shaft 110 which is always pushed in the outward direction by a helical spring 162 disposed between sprocket wheel 108 and the clutch 165. A cam 161 is rotatably mounted on the shaft 110. The cam 161 is provided with a gradually projecting portion 161', and is rotated at its mounted position by the upward motion of a connecting rod 160 (in FIG. 5) through an intermediate transmitting member (not shown). Therefore, when the projecting portion 161' pushes the clutch 165 inward in the opposing condition to the helical spring 162, the clutch portion 108' engages with the clutch 165'. A ratchet wheel 109 is secured to the shaft 110 and a pawl 118 pivoted by a pin 118' disposed to the anti-sloughing device 104 always has its end pawl portion engaged with the tooth of the ratchet wheel 109 so as to prevent the free rotation of a sprocket wheel 115 (FIG. 6). The other end of the pawl 118 is connected to a controlling member (not shown) for releasing the engagement of the pawl 118 with the tooth of the ratchet wheel 109 when it is necessary to rotate the ratchet wheel 109 in the return direction. Another sprocket wheel 111 is secured to the shaft 112 and a chain 113 is belted around the sprocket wheels 115 and 11. A slider 123 is secured to the chain 113 and supports the anti-sloughing tube through a supporting plate 124 secured to its outside portion. The slider 123 is slidably mounted on a guide shaft 122 as shown in the drawing. A tension spring 125 is mounted on the guide shaft 122 under the slider 123 so as to always push the slider upward. An anti-sloughing tube 105, containing a yarn guide 103 at the upper supporting position of it, is secured to the supporting plate 124. In FIG. 7, a rack 106 having a straight portion 106a without teeth and a toothed portion 106b is shown. When the respective winding unit comes to the position in front of the straight portion 106a of the looped rack 106, the meshing of the pinion 121 with the teeth of the rack 106 no longer occurs consequently, the pinion shaft 120 is freed. Or a portion 106c of the rack 106 recedes from the path of the pinion 121 in the direction shown in FIG. 8 and consequently, the pinion shaft 121 stops its rotation when it is necessary to stop the rotation of the pinion 120.

*Control device for controlling the yarn length of a full package*

Figure 11:
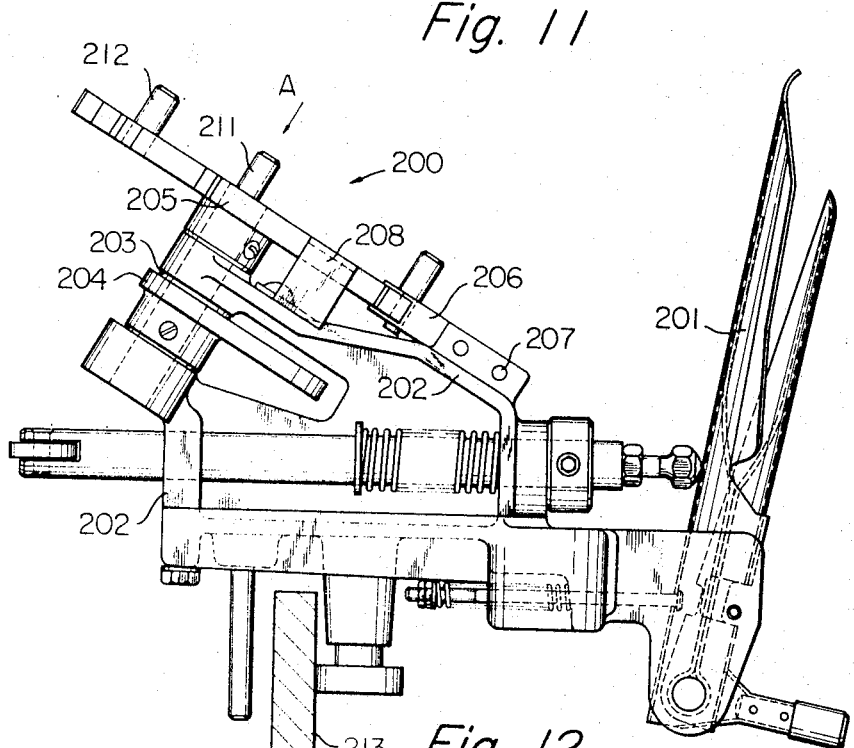
FIG. 11 is a detailed side view of the counter of the controlling device for controlling the yarn length of a full packaged cheese or cone shown in FIG. 1.
Figure 12:
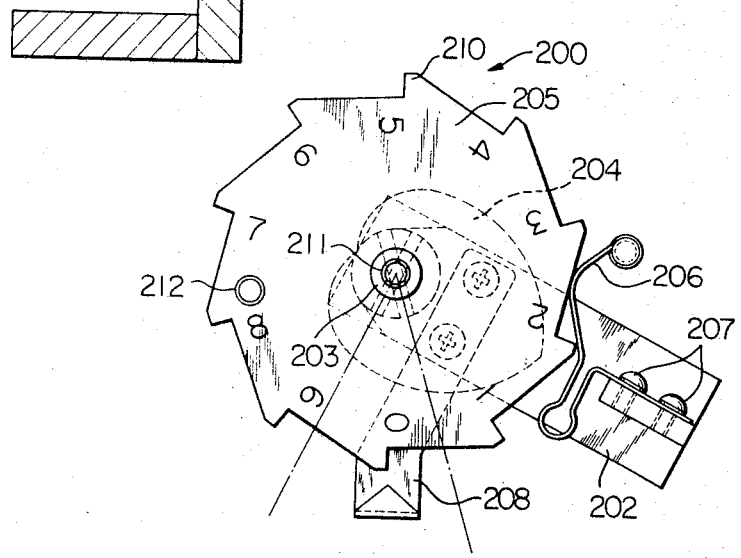
FIG. 12 is a plan view of the counter shown from side A in FIG. 11.

Referring to FIGS. 1, 11 and 12, a control device for controlling yarn length of a full package according to the invention, comprises a counter mechanism secured to a respective winding unit which is carried along a guide rail 213 of a looped passage of the winder so as to carry the respective winding unit to the new cop supplying device with a predetermined period, and a detecting mechanism for detecting a full package of the winding unit by contacting the above-mentioned counter.

As shown in FIG. 11, a counter mechanism 200 is provided with a counter bracket 202 having a peg 201 at its end portion for supporting a cop, a heart cam 204 secured to a shaft 203 disposed to the counter bracket 202 in such a way that the shaft 203 crossly passes the two parallel flange portions of the counter bracket 202.

A ratchet wheel spring 206 is secured to the counter bracket 202 by a set screw 207 so as to normally stop the rotation of a ratchet wheel 205 when the spring 206 engages with an intermediate portion between teeth of the ratchet wheel 205. An indicator 208 is secured to the counter bracket 202 by a set screw, and figures from zero to nine of the ratchet wheel 205 are arranged at the positions corresponding to the teeth of the ratchet wheel 205.

Figure 8:
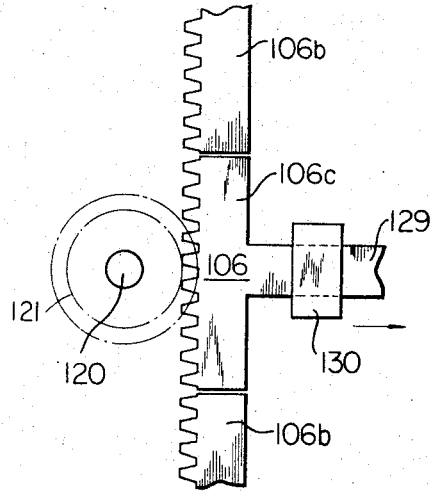
Figure 9:
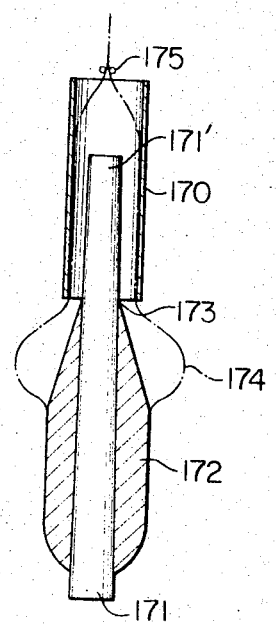
FIG. 9 is a side sectional view of the anti-sloughing tube showing the relation with supply cop.
Figure 10:
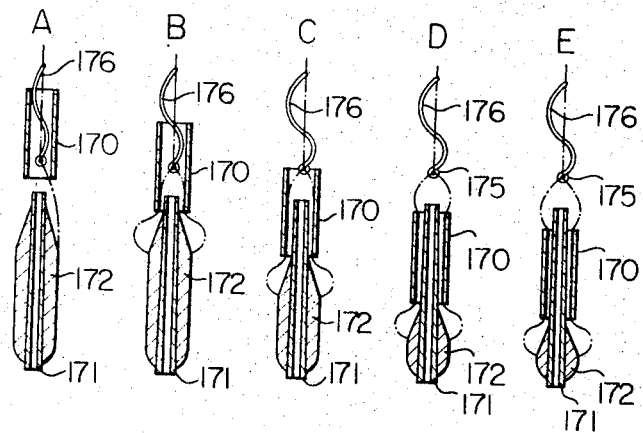
FIGS. 10A, 10B, 10C, 10D and 10E are sectional side views of the anti-sloughing tube and supply cop, at different operating positions of the anti-sloughing tube, according to the present invention.

A ratchet wheel pin 211 which is the top end portion of the counter shaft 203 is projected from the ratchet wheel 205, another wheel pin 212 having the same height as that of the ratchet wheel pin 211 is secured vertically on the ratchet wheel 205 at a position adjacent to FIGURE 8 on the ratchet wheel 205.

In the present embodiment, the number of teeth of the ratchet wheel 205 is 10, and the numerals 0, 1, 2, 3, 4, 5, 6, 7, 8 and 9 are arranged at the corresponding portions of the ratchet wheel 205 in the order shown in FIG. 12. The heart cam 204 is rigidly disposed under the ratchet wheel 205 in such a way that the indicator 208' faces the numeral 0 marked on the ratchet wheel 205 when the heart cam is in the condition shown in FIG. 12.

The respective counter bracket 202 is carried with the respective winding unit along the guide rail 213.

Figure 13:
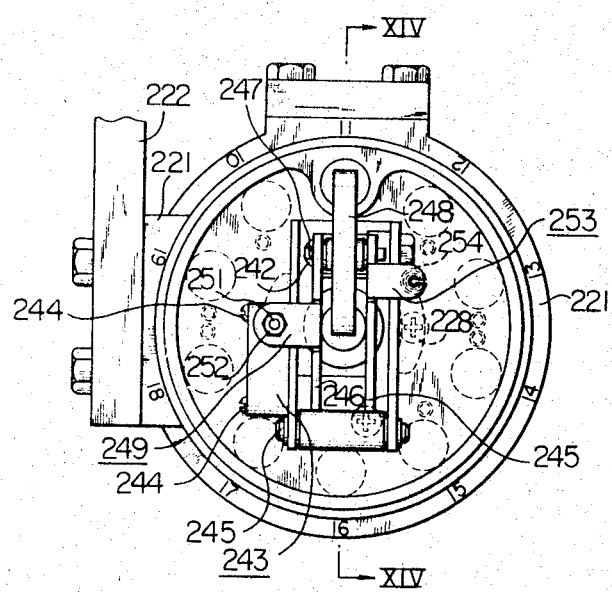
FIG. 13 is a plan view of the full package detecting mechanism of the controlling device with the cover removed.
Figure 15:
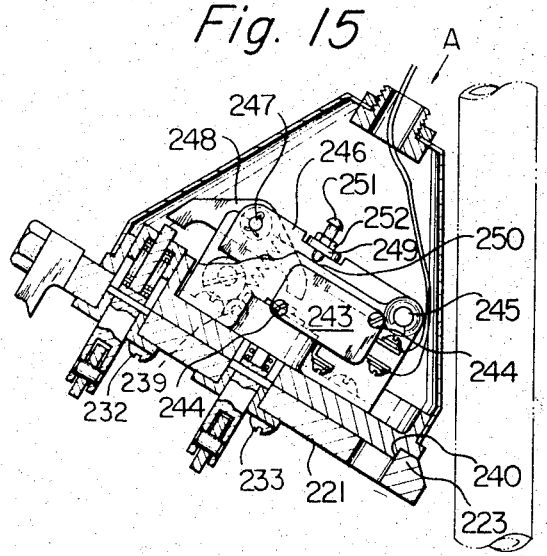
FIG. 15 is a detailed side view of the switch member of the sensing device shown in FIG. 13.
Figure 14:
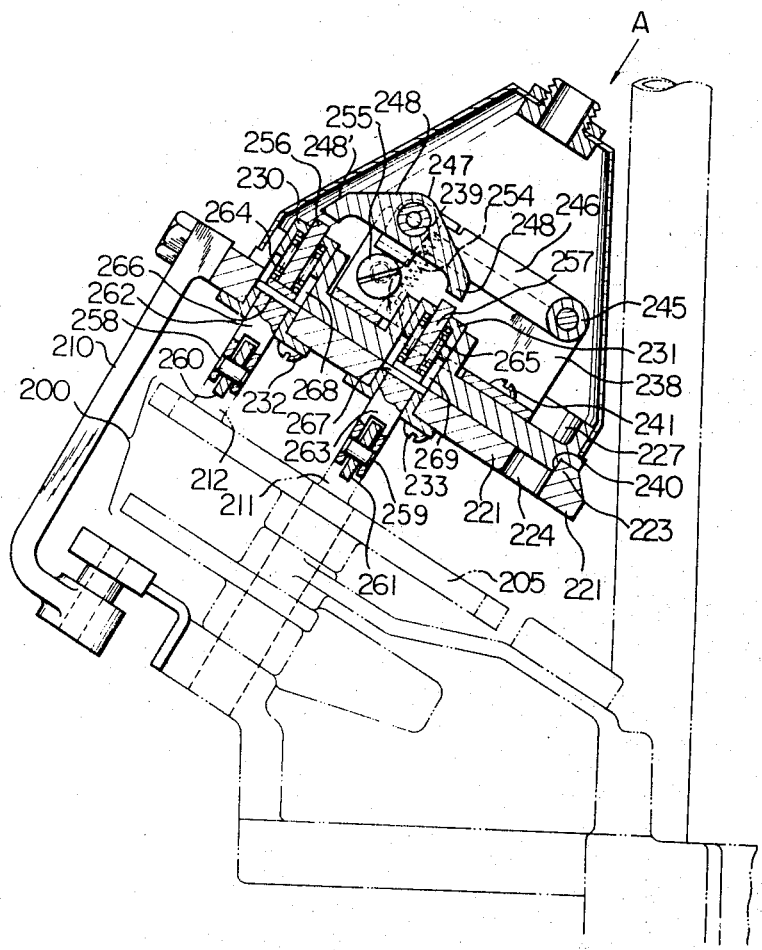
FIG. 14 is a vertical sectional view of the sensing mechanism, taken along XIV—XIV in FIG. 13.
Figure 16:
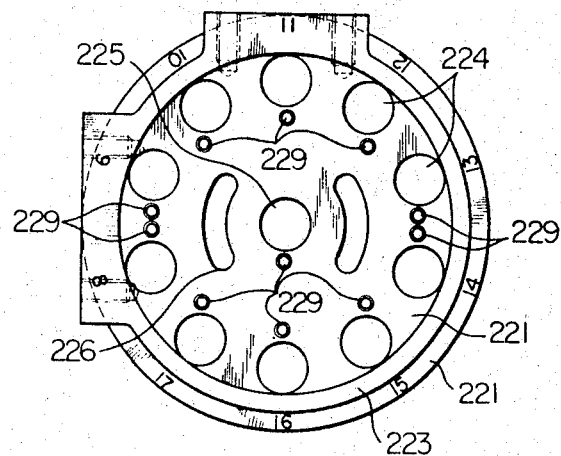
FIG. 16 is a plan view of the counter frame of the invention.
Figure 17:
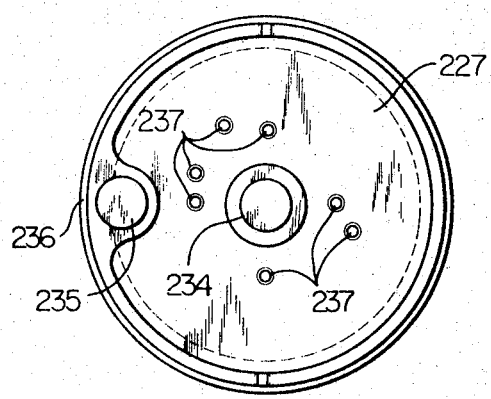
FIG. 17 is a plan view of the counter base of the invention.

Referring to FIGS. 13, 14 and 15, a counter frame 221 of the detecting mechanism is secured on the frame of the winding machine by a bracket 222. The counter frame 221 is provided with a flanged portion 223 disposed at the circumferential portion of a disc plate and a plurality of circular apertures 224 disposed at the circumferential portion of the disc plate at equal distances and a central aperture 225 disposed at the central portion of the disc plate. The number of apertures 224 is the same as that of the teeth of the ratchet wheel 205. At the outer circumferential position of the counter frame 221, numerals from 0 to 9 are marked in the order of the positions corresponding to the respective apertures 224. The counter frame 221 is provided with a pair of adjusting apertures 226 for mounting a counter base 227 on the counter frame 221 by a pair of set screws 228, and with a plurality of setting apertures 229 for mounting spring housings 230, 231 on the counter frame 221 by set screws 232 and 233. The counter base 227 is provided with a central aperture 234 for inserting the spring housing 231 at its central portion, and with an aperture 235 for inserting the spring housing 230 at an edge portion of it. A scale 236 is marked at the circumferential edge portion of the counter base 227 so as to make it match with the numerals of the counter frame 221.

Further, the counter base 227 is provided with a plurality of small apertures 237 for securing a limit switch 238 and a spring hook 239. The counter base 227 is mounted on the counter frame 221 in such a way that a bottom outer edge 240 is closely engaged with the inner face of the upper flanged portion 223 of the counter frame 221 as shown in FIGS. 13 and 14. The limit switch bracket 238 is mounted on the counter base 227 by set screws 241 and 242, and a limit switch 243 is secured to the limit switch bracket 238 by set screws 244. A pair of limit switch levers 246 and 246' are turnably supported by a shaft 245 disposed at an end of the limit switch bracket 238, and a counter lever 248 is turnably mounted on a shaft 247 passing through the end portions of the limit switch levers 246 and 246'. An outward projecting tongue piece 249 is disposed on the limit switch lever 246 at its middle portion, and a set screw 251 for pushing a push button 250 for actuating the limit switch 243 is secured on the tongue piece 249 by a nut 252. Another outward projecting tongue piece 253 is disposed on the limit switch lever 246'. A spring 254 is disposed between the central portion of the tongue piece 253 and the spring hook 239 disposed on the counter base 227 so as to turn the limit switch lever 246 around the shaft 245 in the counterclockwise direction and to always maintain the connection of the limit switch lever 246 with an eccentric screw 255 disposed on the limit switch bracket 238. Consequently, the turning angle of the limit switch lever 246 is decided by the turning of the eccentric screw 255. A pair of push pins 262 and 263 are inserted in the spring housings 31, respectively. The push pins 262 and 263 comprise smaller diameter top portions 256, 257 and bottom end grooved portions for supporting nylon rollers 260 and 261 by roll pins 258 and 259, respectively. The push pins 262 and 263 are always pushing downward by the respective springs 264 and 265, as shown in FIGS. 13 and 14. Stopper pins 266 and 267 are slidably engaged with the respective vertical grooves 268 and 269 of the spring housing 230 and 231 for stopping the turning of the push pins 262 and 263. The spring housing 231 is always disposed at the central portions of the counter frame 221 and the counter base 227, on the other hand, the position of the spring housing 230 can be changed by suitable selection of the combination of the aperture 224 of the counter frame 221 and the aperture 235 of the counter base 227. A cover 270 protects the above-mentioned construction of the detecting mechanism.

Figure 18:
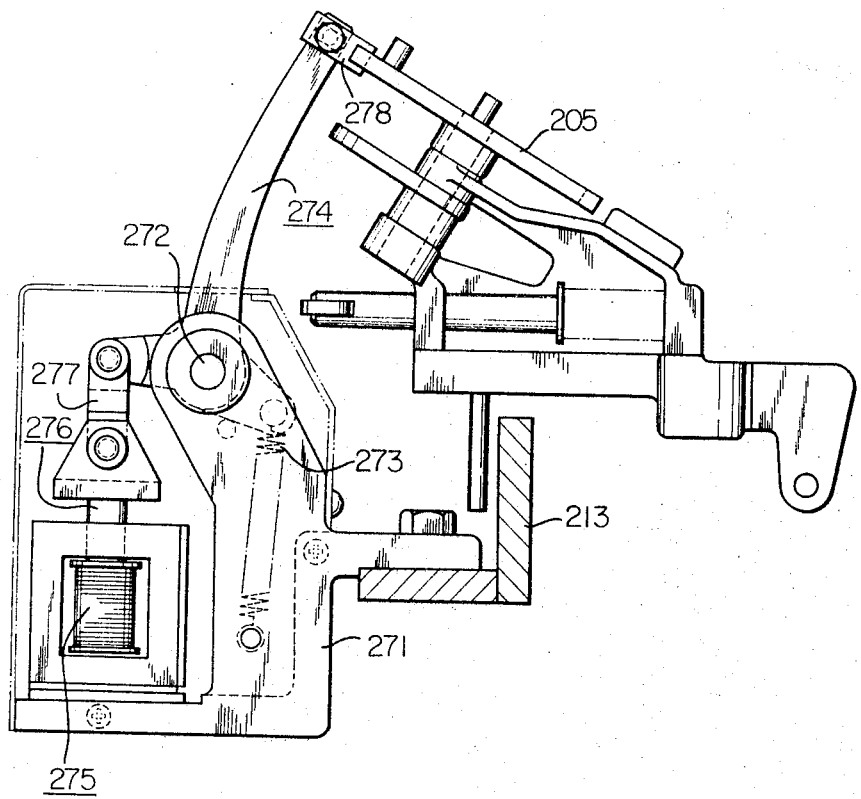
FIG. 18 is a side view of an actuating mechanism of the counter of the invention.

Referring to FIG. 18, a mechanism for turning the ratchet wheel 205 tooth by tooth, is disposed on a stay 271 secured to the guide rail 213. The above-mentioned mechanism for turning the ratchet wheel 205 comprises a Y-shaped lever 274 and a solenoid 275 respectively mounted on the frame of the winder. The Y-shaped lever 274 is rotatably supported by a shaft 272 and is always maintained in a condition of clockwise turning by a spring 273 so as to maintain the engaged relation between a pawl 278 disposed on the top end of the Y-shaped lever 274 with the tooth of the ratchet wheel 205. Thereby, when the solenoid 275 is excited, the solenoid 275 pulls a plunger shaft 276 so as to turn the Y-shaped lever 274 counterclockwise, consequently the engagement of the pawl 278 with the tooth of the ratchet wheel 205 is released.

Figure 19:
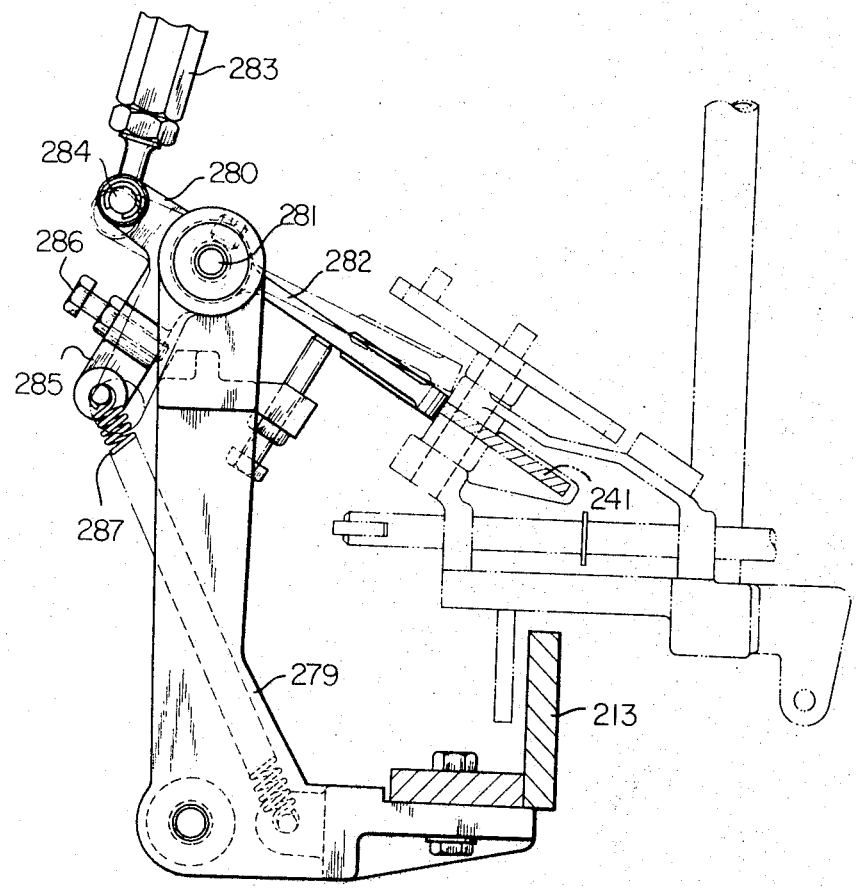
FIG. 19 is a side view of the re-setting mechanism of the counter.

Referring to FIG. 19, a re-set mechanism comprises a T-shaped lever 280 rotatably supported by a shaft 281 disposed to a stay 279 secured on the guide rail 213. One end of the T-shaped lever 280 forms a cam 282 which contacts with the heart cam 204, and a connecting with an air cylinder (not shown) is turnably mounted on the other end of the lever 280. A stopper 286 and a spring 287 is secured at an extended rod portion 285 of the lever 280 so as to turn the lever 280 counterclockwise.

*Motion of the anti-sloughing device for controlling ballooning*

Before the winding operation, the supply cops are supplied to the respective winding unit in such a way that a cop is supported almost vertically by the respective pegs for supporting the cop, the anti-sloughing tube 5 of the respective winding unit is carried to the uppermost position of its path and then the winding operation starts (referring to FIGS. 1, 2, and 3). As the respective winding unit travels, the end portion 40' of the lever 40 of each anti-sloughing device of the winding units contacts with the cams 11 disposed on the machine frame 1 of the winding machine and passes under the cams 11. Consequently, the lever 40 is pressed downward at each passage of the lever 40 under the cams 11, the lever 38 contacting with the lever 40 with the pawl 41 turns around the shaft 37 in the counterclockwise direction, and thereby the plate-shaped lever 28 is turned in the clockwise direction through the pin 36 engaging with the groove of forked portion 39 of the lever 38 while the spring is compressed, the pawl 35 disposed on the lever 28 turns the ratchet wheel 23 only slightly corresponding to a tooth of the ratchet wheel 23 in the clockwise direction, at the same time, the chain wheel 24 coaxially secured on the ratchet wheel 23 is turned in the clockwise direction. Consequently, the chain 27 engaging with the chain wheel 24 is transferred, the slider 55 secured on the chain 27 presses a spring 56, a shaft 54 is shifted downward and the anti-sloughing tube 5 which is supported by a supporting plate 58 also moves downward. And, when the top end portion 40' of the lever 40 passes the position of the cam 11, the lever 28 is turned around the shaft 22 in the counterclockwise direction by the force of the spring 31, and is returned to its original position while the returning motion of the lever 38 and 40 also return to their original positions, however, the counterclockwise turning of the chain wheel 24 and the ratchet wheel 23 is prevented by the engagement of the pawl 44 with the ratchet wheel 23, that is, the ratchet wheel 23 and the chain wheel 24 cannot return to their former positions. As mentioned above, the ratchet wheel 23 is turned by a tooth at each action of the cam 11.

The relation between number of teeth of the ratchet wheel 23 and number of cams disposed on one looped travelling passage of the respective winding unit of the winding machine is chosen in such a way that, if the above-mentioned number of cams 11 is twelve, the number of teeth of the ratchet wheel 23 should be twelve, so as to shift the anti-sloughing tube from the uppermost position to the lowermost position while the respective winding unit travels one round along the looped passage of the winding machine; if the number of cams 11 is twenty-four, the numbers of teeth of the ratchet wheel 23 should be twenty-four.

To return the anti-sloughing tube 5 to the uppermost position when the yarn of the supply cop is exhausted, it is only necessary to turn an operating lever 53 downward, that is when the lever 53 is turned downward, the shaft 50 is turned clockwise, consequently, the lever 52 is turned clockwise, thereby the engagement of the pawls 44 and 35 with the ratchet wheel are released by the pushing motion of lever 53 on the pin 48 of the pawl 44 and the pin 49 of the pawl 35 in the clockwise direction. By the above-mentioned motion, the ratchet wheel 23 becomes free, the slider 55 is pushed up by the resilient force of the spring 56 to the uppermost position, consequently the chain 27, the chain wheel 24, the ratchet wheel 23 are turned counterclockwise and the anti-sloughing tube 5 is shifted to its uppermost position, as shown in FIG. 2.

Beside the above-mentioned operation, when the cradle arm 10 is shifted upward by yarn breakage of the winding unit, a connecting rod 60 connecting the cradle arm 10 with the lever 40 is pulled upward, thereby the lever 40 is shifted upward as shown by the dotted line in the drawing and the lever 40 does not engage with the cams 11.

As mentioned above, the anti-sloughing tube is shifted downward gradually with each round of travel of the respective winding unit, that is, to the exhausted condition of the supply cop supported by the respective peg while the winding units are travelling along the looped passage of the winding machinery, moreover, the shifting speed of the anti-sloughing tubes of the respective winding units can be adjusted by changing the number of cams 11 and their positions.

Referring to FIG. 5, when the winding unit travels, the pinion 121 is rotated by the engagement with the teeth of rack 106 disposed to the machine frame. Consequently, the sprocket wheel 114 is rotated around the shaft 120 by the power transmission of the intermediate gear train 119, in the counterclockwise direction in FIG. 5. The rotation of the sprocket wheel 114 is transmitted to the sprocket wheel 108 and the shaft 110 is rotated counterclockwise. When the projecting portion 161' of the cam 161 presses the clutch 165 so as to engage the clutch portion 165' with the clutch portion 108' of the other sprocket wheel 108, the rotation of the shaft 110 is transmited to the ratchet wheel 109, consequently, the chain 113 is turned counterclockwise and the suupporting plate 124, therefore, the anti-sloughing tube 105 is shifted downward continuously. And, when the winding yarn is broken, the cradle arm 10 is turned counterclockwise in FIG. 5, and the connecting rod 160 is pulled upward. Consequently, the projecting portion 161' of the cam 161 recedes from the clutch 165 and the engagement of the clutch 165 with the sprocket wheel 108 is released by the expansion force of the spring 162. The rotation of the sprocket wheel 108 is stopped while the sprocket wheel 115 is still rotating by the engagement of the pinion 121 with the rack 106. When it is necessary to return the anti-sloughing tube 105 to its uppermost position, such as when starting the winding operation, the engagement of the pawl 118 with the ratchet wheel 109 is released further, beside the motion of the clutch 165. As is well known, in some types of the travelling winder the supply cop must be changed each round of the respective winding unit along the looped passage. In the above-mentioned case, the rack shown in FIG. 7 may be used, that is, the plain portion 106a of the rack 106 is disposed to the end portion of the looped passage so as to release the engagement of the pinion shaft 120 with the rack 106 to stop the rotation of the shaft 110. On the other hand, when it is necessary to carry the respective winding unit two or more rounds along the looped passage while supplying yarn from a supply cop, the rack shown in FIG. 8 may be used, that is, the engagement of the pinion shaft 120 with the rack 106 is released by the receding motion of the portion of a rack 129 from the working position only for changing supply cop.

*Relation between the anti-sloughing tube and the supply cop for obtaining better controlling effect*

Referring to FIGS. 9, 10A, 10B, 10C, 10D and 10E, the anti-sloughing tube has a smaller inner diameter than that of the largest diameter of supply cop 172 wound around a bobbin 171. The above-mentioned limitation of the inner diameter of the anti-sloughing tube is very effective balloon for controlling ballooning 174. Further, the working condition is selected such that an anti-sloughing tube 170 as shown in FIGS. 10A–10E, that is, at the starting point, the anti-sloughing tube 170 is supported at the upper position of the supply cop 172 in such a way that the anti-sloughing tube 170 contains the yarn guide 176 in it, and after the anti-sloughing tube 170 is shifted downward to the position shown in FIG. 10B, the bottom end of the anti-sloughing tube 170 is positioned at the nose of the cop 172 as the yarn of the supply cop 172 is consumed.

Concerning the shape of the anti-sloughing tube, the anti-sloughing tube has a cylindrical form but with a slit longitudinally disposed to the tube and has a rectangular shaped long case, etc. However, in all of these, the inside space of the anti-sloughing tube 170 must have sufficient space for permitting the insertion of a bobbin head 171' and a yarn guide 176.

Motion of the control device for controlling yarn length of full package

Referring to FIGS. 11, 12, 13, 14, 15, 16, 17, 18 and 19 a plurality of winding units of the automatic winder are carried along the looped rail to the counters 200 disposed to the respective winding unit. Zero point of the marked numerals 9 of the ratchet wheel 205 is made to face the indicator 208 by contracting the heart cam 204 with the cam 282 beforehand. Supposing that the full packaged cheese or cone to be produced is set at five normal supply cops, the scale 236 of the counter base 227 of the detecting device is set to face the numeral 5 of the counter frame 221, the spring housing 230 is inserted through the aperture 224 of the counter frame 221 and the aperture 235 of the counter base 227. Also, the spring housing 231 is inserted into the aperture 225 of the counter frame 221 and the aperture 234 of the counter base 227. Consequently, the push pins 262 and 263 supported by the spring housing 230 and 231, respectively, are projected under the detecting mechanism of the counter. When a fresh, normal cop is supplied to the peg 201 of the winding unit, the solenoid 275 is excited by the above-mentioned supply of fresh cop, the Y-shaped lever 274 is turned around a shaft 272 in the clockwise direction in FIG. 18, thereby the pawl 278 engages with a tooth of the ratchet wheel 205 of the counter mechanism 200. As the counter 200 is disposed on the respective winding units, the counter 200 is also carried with the respective winding units, the tooth of the ratchet wheel 205 of the counter 200 engages with the pawl 278 projected to the passage of the winding units when the solenoid 275 is excited as mentioned above, consequently, the ratchet wheel 205 is turned by a tooth at each engagement of the pawl 278 with the tooth of the ratchet wheel 205. The indication is changed from numeral 0 to 1 by the turning of the ratchet wheel 205 by a tooth, then the pawl 278 returns to its original receded position when the solenoid 275 is de-energized. The above-mentioned turning motion of the ratchet wheel 205 is repeated at each supply of fresh bobbins to the respective winding unit.

The counter of the respective winding units are carried to the detecting mechanism by the travelling motion of the respective winding unit, while the counter is turned a little at a time. When the counter 200 arrives at the detecting mechanism, the ratchet wheel pin 211 disposed on the center portion of the ratchet wheel 205 engages with the push pin 263 of the detecting mechanism, the ratchet wheel pin 211 pushes the push pin 263 upward in such a way that the roll 261 supported by the top end portion of the push pin 263 is pushed upward so as to compress the spring 265. Thereby, the top end portion 257 of the pin 263 pushes an end portion 248' of the center lever 248 and the center lever 248 turns counterclockwise around the shaft 247. In the above-mentioned motion, the wheel pin 212 of the counter 200 does not engage with the push pin 262 of the detecting mechanism, and consequently, the push pin 262 is not pushed upward by the wheel pin 212, except the numeral 9 of the counter 200 shows the predetermined numeral corresponding to the predetermined numbers of the supply cops for winding a full packaged bobbin, after the above-mentioned number of the supply cops are exhausted. And, when the necessary number of supply cops have been wound into a full package, the ratchet wheel 205 turns corresponding to the necessary number of the supply cops, consequently, the position of the wheel pin 212 will change so as to engage with the push pin 262 of the detecting mechanism. When the wheel pins 212 engages with the push pin 262, the wheel pin 212 pushes the push pin 262 upward, in such a way that the roll 60 of the push pin 262 presses the spring 264, the top end portion 256 of the push pin 262 pushes an end portion 248" of the center lever 248, thereby the center lever 248 is turned around the shaft 247 in the clockwise direction. However, as the push pin 263 is positioned at its upward position by the engagement with the ratchet wheel pin 211, the center lever 248 cannot turn and is shifted upward as it is. That is, as shown in FIGS. 13, 14 and 15, as the shaft 247 supporting the center lever 248 is supported by limit switch levers 246, 246' which are rotatably supported by the shaft, when the center lever 248 is pushed upward with the shaft 247 by the top end portions 256 and 257 of the respective push pins, the limit switch lever 246 is turned around the shaft 245 in the clockwise direction while the spring 254 disposed between the spring hook 239 and the tongue piece 253 of a lever 264' is compressed, thereby the pressure of the push buttom 250 of the limit switch 243 on set screw 251 disposed to the tongue piece 249 of the limit switch lever 246 is released, consequently, the electric circuit of the limit switch 243 is closed so as to switch on the signal lamp (not shown) or to actuate an automatic doffing device. As mentioned above, the setting of the counter of the winding unit which automatically doffs a full packaged bobbin is returned to the starting position designated by "0" by the action of the reset mechanism for resetting the counter shown in FIG. 19. That is, when the automatic doffing motion of a winding unit is completed, the actuating member of an air cylinder 283 receives an electrical signal for actuation, and the air cylinder 283 turns the T-shaped lever 280 around the shaft 281 so as to contact the cam 282 with the heart cam 204. The counter 200 which is to the working position of the cam 282 is turned to the starting position designated by the numeral "0" in such a way that the heart cam 204 is turned to the position shown in FIG. 12 and then stopped. After the above-mentioned resetting motion, the succeeding winding operation of the winding unit starts. As mentioned above, in the automatic control system for wound length of the full packaged cheese or cone according to the invention, when the winding units which have already completed winding yarn to form the predetermined numbers of supply cops are detected, and when the detecting mechanism detects the full packaged cheese or cone of the respective winding unit, the signal indicates a full package of the respective winding unit for operating doffing of the full package cheese or cone by an operator, or actuates an automatic doffing apparatus attached to the winding machine so as to doff the full packaged cheese or cone from the respective winding unit, consequently, the full packaged cheese or cone having more uniform wound length of yarn and more uniform diameter of the package compared with those of the packages produced by the conventional winding machine can be produced.

While the invention has been described in conjunction with certain embodiments thereof is to be understood that various modifications and changes may be made without departing from the spirit and scope of the invention.

What is claimed is:

1. In an automatic winding machine having a main frame and a plurality of winding units travelling along a looped passage surrounding said main frame of said winding machine, means for supplying a fresh cop to each of said winding units, means for doffing a full packaged cop from each of said winding units, a supply cop and a winding drum mounted on each of said winding units, each of said winding units winding yarn from said supply cop to said winding drum disposed on said same winding unit, a stationary tension device mounted on said winding units at a position just below said winding drum; the improvement comprising: anti-sloughing means movably located along the yarn path from said supply cop to said tension device for preventing sloughing yarn from said supply cop; shifting means for shifting said anti-sloughing means toward said supply cop along said yarn path from an original upper position to a lower position in accordance with the decreasing length of yarn on said supply cop while said winding unit travels along said looped passage, return means to return said anti-sloughing means to its original upper location just below said tension device at each round of travelling of said winding unit along said looped passage.

2. An improved winding machine having a plurality of winding units according to claim 1, wherein said anti-sloughing means comprises a hollow tube having a longitudinal slit extending along said yarn path.

3. An improved winding machine having a plurality of winding units according to claim 2, further comprising a yarn guide disposed within said tube and under said tension device when said hollow tube is positioned at its original upper position.

4. An improved winding machine having a plurality of winding units according to claim 2, wherein said hollow tube has a slightly smaller diameter than the maximum diameter of said cop.

5. An improved winding machine having a plurality of winding units according to claim 2, wherein said shifting means moves to always locate the bottom edge of said hollow tube adjacent an upper portion of the wound yarn remaining on said supply cop.

6. An improved winding machine having a plurality of winding units according to claim 5, wherein said shifting means is provided with means for shifting said anti-sloughing tube continuously toward said supply cop.

7. An improved winding machine having a plurality of winding units according to claim 5, wherein said shifting means is provided with means for shifting said anti-sloughing tube step by step toward said supply cop.

8. An improved automatic winding machine having a plurality of winding units according to claim 1, wherein said shifting means comprises a pair of respective shafts disposed to the respective winding units; a pair of sprocket wheels rotatably mounted on said shafts, respectively; a chain belted around said sprocket wheels; a supporting plate for supporting said anti-sloughing tube secured to said chain; a looped rack disposed on said winding units at the position corresponding to said looped passage of the respective winding units; a pinion disposed on each of said respective winding units, respectively, meshing with said looped rack, while said winding units are travelling along said looped passage; intermediate gear trains disposed on the respective winding units, respectively, said gear trains transmitting the rotation to one of said sprocket wheels during said winding operation; a stopper disposed to the respective winding units for preventing free turning of said sprocket wheels which provides upward movement of said supporting plate; actuating members for releasing the stopping action of said stopper; a guide rod almost vertically disposed on the respective winding units for guiding motion of said supporting plate; a slider which said guide rod passes through; a tension helical spring mounted on said guide rod at the under position of said supporting plate biasing said guide plate upward through said slider; whereby, when the respective winding units travel along said looped passage, said sprocket wheels rotate according to the gearing of said pinion with said looped rack during the winding operation so as to continuously shift said anti-sloughing means of the respective winding units, and consequently, said supporting plate is transferred continuously toward said supply cop in the opposing condition to said tension helical spring, and said anti-sloughing tube is continuously shifted toward the supply cop.

9. An automatic winding machine having a plurality of winding units according to claim 1, wherein said shifting mechanism comprises a shaft disposed on the respective winding units; a ratchet wheel rotably mounted on said shaft; a first sprocket wheel disposed to the respective winding units at the under position of said ratchet wheel; a second sprocket wheel coaxially secured to said shaft of the ratchet wheel; a chain belted around both of said sprocket wheels; a supporting plate for supporting said anti-sloughing means secured to said chain; an actuating lever turnably disposed to the respective winding units; a pawl pivotably supported by a top end of said actuating lever, said pawl contacting with the teeth of said ratchet wheel; a plurality of stoppers disposed to the respective winding units for preventing free turning of said ratchet wheel which provides upward movement of said supporting plate; actuating members for releasing the stopping action of said stoppers; a guide rod almost vertically disposed to the respective winding units for guiding motion of said supporting plate; a slider which said guide rod passes through; a tension helical spring mounted on said guide rod at the under position of said supporting plate biasing said guide plate upward through said slider; whereby, when said actuating lever actuates to turn said ratchet wheel through said pawl while said releasing members releasing said stoppers; said ratchet wheel turns tooth by tooth with every turn of said actuating lever; consequently, said supporting plate is transferred toward said supply cop gradually in the opposing condition to said tension helical spring, and said anti-sloughing means is shifted toward said supply cop gradually.

10. An improved automatic winding machine having a plurality of winding units according to claim 9, wherein said shifting mechanism further comprises a releasing mechanism coupled to said shifting mechanism, which can be operated by manual operation for releasing said stoppers, whereby, when said stoppers are released from the engagement with said ratchet wheel by manual operation of said releasing mechanism, said ratchet wheel turns to its original position corresponding to the upper position of said supporting plate by the force of said helical spring.

11. An improved automatic winding machine having a plurality of winding units according to claim 9, further comprising a plurality of cams disposed on the machine frame of the winding machine with predetermined intervals engaging with said actuating lever and turning said ratchet wheel at every engagement with the respective actuating lever tooth by tooth.

12. An improved automatic winding machine having a plurality of winding units according to claim 11, wherein said cams are disposed at a plurality of positions, the number of teeth of said ratchet wheel being equal to the number of said cams.

13. An improved automatic winding machine having a plurality of winding units according to claim 1, further comprising a counting means for counting the number of turns of said winding units and disposed to each winding unit, an actuating means for turning said counting means, means for detecting the condition of full package of each of said winding units in a related condition to said counting means, said actuating means and counting means mounted on said frame of said winding machine.

14. An improved automatic winding machine having a plurality of winding units according to claim 13, wherein said counting means comprises counters of said respective winding units, said counter comprising a counter bracket disposed to said winding unit, a shaft rotatably secured on said counter bracket, a heart cam having upper and lower positions perpendicularly secured to said counter shaft, a ratchet wheel perpendicularly secured on said counter shaft at the upper position of said heart cam, a plate spring secured to said counter bracket, a free portion of said spring engaging with an intermediate portion between the teeth of said ratchet wheel so as to normally stop the free rotation of said ratchet wheel, said ratchet wheel provided with marks for showing figures corresponding to the number of teeth at an edge portion of each tooth of said ratchet wheel in due order from figure "0," said counter shaft projected upward over said ratchet wheel in the form of a ratchet wheel pin, a wheel pin having same height as that of said ratchet wheel pin and secured perpendicularly to said ratchet wheel at a selecting position of numerals of said ratchet wheel according to the number of cops for producing full package.

15. An automatic winding machine having a plurality of winding units travelling along a looped passage according to claim 13, wherein said actuating means comprises a ratchet wheel mounted on said frame, a turnable lever disposed on said frame of said winding machine at a succeeded portion of said fresh cop supply device, a pawl supported on said turnable lever, an electrical means for turning said lever together with said pawl by engagement with said ratchet wheel when a fresh cop supplied to said winding unit and said winding unit comes before said actuating means.

16. An improved automatic winding machine having a plurality of winding units according to claim 15, wherein, said detecting means comprises a first spring housing, circular plate members superposed together and supported at their center position by said spring housing, a second spring housing secured perpendicularly to said circular plate members at a selected position which corresponds to a position of said wheel pin of said counter pin facing said wheel pin when said counter of said winding unit is carried to the working position of said detecting means, both spring housings having a push pin slidably inserted into the respective spring housings and a spring pushing the respective push pins downward, said push pins having a roller projected downward respectively and projecting upward from said circular plate members, an electrical means comprising a limit switch disposed upon said circular plate members, a limit switch lever pivoted at its end to said circular plate members, a plurality of intermediate members for transmitting the motion of said push pins to said limit switch lever, a spring for biasing said intermediate members in the downward direction; whereby, when said selected position of said spring housing is set according to the number of supply cops for producing a full package, and when said counter has turned its ratchet wheel by a selected number of teeth according to the consumption of a selected number of supply cops carried to the working position of said detecting means, said push pins of said detecting means are pushed in an upward direction by engagement with said ratchet wheel pin and wheel pin, thereby, said electrical means is actuated by the upward movement of said intermediate members so as to develop an electrical signal for showing the condition of a full package.

References Cited

UNITED STATES PATENTS

| | | | |
|---|---|---|---|
| 2,994,491 | 8/1961 | Weber | 242—128 |
| 3,011,736 | 12/1961 | Furst et al. | 242—128 |
| 3,092,340 | 6/1963 | Furst | 242—35.5 |
| 3,184,174 | 5/1965 | Furst | 242—35.5 |
| 3,199,806 | 8/1965 | Jenny | 242—128 |
| 3,236,466 | 2/1966 | Yoshida et al. | 242—35.5 |

FOREIGN PATENTS 1,146,746  5/1957  France.

STANLEY N. GILREATH, *Primary Examiner.*

U.S. Cl. X.R.

242—36